United States Patent [19]

Arnold

[11] Patent Number: 4,814,037

[45] Date of Patent: Mar. 21, 1989

[54] METHOD OF MAKING SHOES USING A PARTICULAR SHOE STIFFENER

[75] Inventor: Brian Arnold, Syston, England

[73] Assignee: Emhart Industries, Inc., Farmington, Conn.

[21] Appl. No.: 102,829

[22] Filed: Sep. 23, 1987

Related U.S. Application Data

[63] Continuation of Ser. No. 704,963, Feb. 25, 1985, abandoned.

[30] Foreign Application Priority Data

Mar. 2, 1984 [GB] United Kingdom ............... 8405587

[51] Int. Cl.⁴ .................. B29C 67/00; B32B 31/00; B32B 27/36; A43D 21/00
[52] U.S. Cl. .................................... 156/321; 156/580; 428/412; 428/216; 428/475.8; 428/476.1; 428/516; 36/45; 36/68
[58] Field of Search ............... 428/412, 216, 475.8, 428/476.1, 516; 36/45, 68 R; 156/580, 321

[56] References Cited

U.S. PATENT DOCUMENTS

| | | | |
|---|---|---|---|
| 3,964,951 | 6/1976 | Kremer et al. | 156/308.2 |
| 4,038,449 | 7/1977 | Uemura et al. | 428/517 |
| 4,115,612 | 9/1978 | Closson, Jr. | 428/172 |
| 4,197,069 | 4/1980 | Cloeren | 425/131.1 |
| 4,220,684 | 9/1980 | Olson | 428/35 |

OTHER PUBLICATIONS

*Chemical Abstracts* (101: 8417r), vol. 101, 1984, p. 52, Abstract No. 8417r, Belg. BE 898,132, "Heat Resistant Laminated Packing Film".
*Chemical Abstracts* (82: 126089), vol. 82, 38-Plastics Manuf., 1975, p. 37, *Abstract* #126089x, Japan Kokai 74, 117,574 "Adhering Polyamides with Polyolefins".
*Chemical Abstracts* 104(20): 169808w, 38-Plastics Fabr., Uses, 1986, p. 63, *Abstract* #169808w, Eur. Pat. Appl. EP 170,385 "Nylon-Based . . . ".

*Primary Examiner*—P. C. Ives
*Attorney, Agent, or Firm*—Thomas S. Szatkowski

[57] ABSTRACT

The invention presents to the art a novel, improved shoe stiffener which comprises co-extruded layers of plastics film. The shoe stiffener comprises co-extruded layers of plastics film, a first of the layers comprising an ionomeric material and providing a main body of the stiffener and a second layer comprising a plastics material which does not adhere to a fusion press under conditions normally encountered therein during bonding of a shoe stiffener to a shoe upper. Nylon 6 is the preferred second layer plastics material. The co-extrusion product replaces fabric backed shoe stiffeners in which flaws induced in the film by the fabric may provide notches from which cracks in the material can propagate.

10 Claims, 1 Drawing Sheet

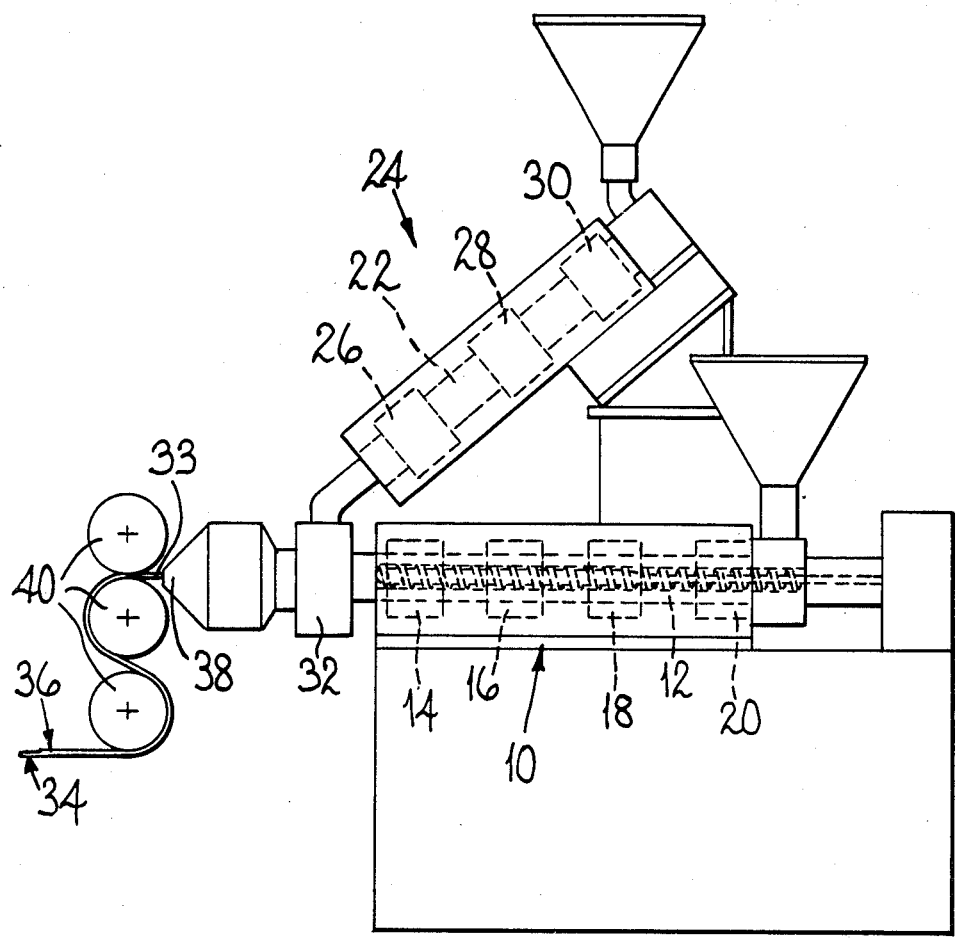

METHOD OF MAKING SHOES USING A PARTICULAR SHOE STIFFENER

This is a continuation of co-pending application, Ser. No. 704,963, filed in Feb. 25, 1985, now abandoned.

THE FIELD OF THE INVENTION

This invention relates to shoe stiffeners and in particular to shoe stiffeners formed from co-extruded plastics materials. The term "shoe" where used herein is to be understood as denoting outer footwear generally, whether ready for wear or in the course of manufacture.

Shoe stiffeners are used in the footwear industry to shape and to provide support for the heel and toe portions of shoes and boots etc. The shoe stiffeners, comprising counters and toe puffs for heel and toe portions respectively, are inserted into shoe uppers prior to lasting and are shaped in the course of lasting to a desired configuration which configuration they retain by being allowed to harden before removal of the shoe upper from the last.

DESCRIPTION OF THE PRIOR ART

It is preferred to use, as a shoe stiffener material, a material which is easy to soften for moulding and has good moulding characteristics and shape retention after lasting and during conditions likely to be met by a shoe in wear. Plastics films have been proposed as shoe stiffeners and ionomeric resins have been found to generally fulfil the requirements of an acceptable shoe stiffener; of the ionomeric resins available we prefer to use Surlyn (RTM).

In the course of manufacture of a shoe, a toe puff is, in some known methods, fused to a shoe upper by a hot melt adhesive using a toe puff fusion press comprising two platens, one of which is heated to a temperature of approximately 180° C. The toe puff and shoe upper are inserted between the platens which are then pressed together and the heated adhesive composition bonds the toe puff to the shoe upper. As the toe puff fusion press is heated to a high temperature, it is necessary to ensure that the shoe stiffener material does not become adhered to the heated platen. This is achieved, in commercially available shoe stiffeners comprising a layer of plastics material, by providing a textile fabric backing to the plastics layer. The fabric backing (either woven or non-woven) also serves to stabilize the plastics film against undue stretching on being coated with the heated adhesive and in shoe manufacture.

It has been found however that the use of a fabric backing tends to weaken the plastics film by producing flaws in the film, e.g. notches, from which cracks can propagate which thus leads to the break up and disintegration of the film and thus the shoe stiffener.

It is known to provide shoe stiffeners comprising layers of plastics materials, see for example UK No. 2 072 487, UK No. 1 141 109 and UK No. 963 725, however the materials used do not satisfy the requirement that the shoe stiffener does not adhere to a fusion press when it is inserted therein and heated to a temperature of the order of 180° C.

It is thus an object of the invention to provide a backing material which overcomes this problem.

BRIEF SUMMARY OF THE INVENTION

The invention therefore provides in one of its aspects a shoe stiffener comprising co-extruded layers of plastics film, a first of the layers comprising an ionomeric material and providing a main body of the stiffener and a second of the layers comprising a plastics material which does not adhere to a fusion press under the conditions normally encountered therein during bonding of a shoe stiffener to a shoe upper.

We have now found that by replacing the fabric backing with a second layer of plastics material which is co-extruded with the ionomeric material such flaws from which cracks can propagate are substantially avoided which leads to a more durable material.

The first layer comprising an ionomeric material and providing a main body of the stiffener preferably comprises Surlyn (RTM). Other ionomeric materials may also be used or two or more such materials may be blended together.

It has been found that by use of a shoe stiffener according to the invention, not only is the formation, in the main body of the stiffener, of flaws from which cracks can propagate substantially avoided but also there appears to be a much reduced cost in providing a plastics backing for the main body of the stiffener in replacement for a fabric backing. In addition, the use of a plastics material as a backing for the main body of the stiffener also gives potential for the scrap material to be re-used whereas the scrap from shoe stiffeners having a fabric backing contains fibrous material and thus may not conveniently be recycled.

The backing to the main body of the stiffener provided by the second layer must, as mentioned hereinabove, comprise a material which does not adhere to a fusion press when the shoe stiffener is inserted therein and heated. This specification generally refers to toe puff fusion presses, however, other similar fusion presses may be included within this definition. When concerned with a toe puff fusion press it is desired that the material providing the second layer does not adhere thereto when the shoe stiffener is heated to temperatures of the order of 180°–200° C. The softening point of said second layer material must therefore be above the temperature to which the press is heated, i.e. the softening point of said material must be at least 180° C. Surlyn (RTM) degrades at a temperature above approximately 280° C. and therefore when Surlyn (RTM) is used as the main body of the stiffener, the softening point of the second layer material must fall below the temperature at which the Surlyn (RTM) degrades. Hence when Surlyn (RTM) is used, the softening point of the plastics material of the second layer should fall within the range 180°–280° C. We prefer to use thermoplastic material as the second layer plastics material. Examples of such materials include polymethylpentene, polyester, polycarbonate and various nylon materials, which may be used either alone or two or more blended together; however, we prefer to use nylon 6 as the second layer material co-extruded with the ionomeric material in a shoe stiffener according to the invention.

The co-extruded layers are produced in a one step process wherein the extruder for the first layer providing a main body of the stiffener e.g. Surlyn (RTM) and the extruder for the second layer e.g. nylon 6 feed into a combining adaptor placed behind the extrusion die from which the co-extruded layers are extruded. Whereas the adhesion between the layers of nylon and zinc grade Surlyn (RTM) is sufficient to avoid the necessity of having an intervening adhesive layer therebetween, the adhesion between sodium grade Surlyn (RTM) and the nylon may not be adequate, as may also occur for example when other plastics materials are used as the second layer, and a tie layer may be necessary. Such a tie layer may be introduced as a third co-extruded layer and should be compatible both with the ionomeric layer and the second plastics layer. Where nylon 6 is used as the second layer and sodium grade Surlyn (RTM) comprises the ionomeric layer we prefer to use sodium grade Surlyn (RTM) as the adhesive layer.

The second layer provides an additional stiffness to the first layer and hence the thickness of the second layer may be a relevant factor in the determination of the stiffness of a shoe stiffener according to the invention. In a preferred shoe stiffener it is desired that the thickness of the nylon layer be as small as possible in order to avoid creases in the finished product. Additionally, many plastics materials are less readily moldable than ionomeric resins, and care must therefore be taken to select for the second layer, material which not only has a suitable softening point to prevent adhesion to the press but also is not such that, in the thicknesses used in the second layer, the moldability and shape retention of the stiffener will be adversely affected. Where nylon is used as the second layer the preferred thickness of the nylon layer is between 0.02 mm and 0.03 mm, more preferably 0.025 mm; however, it is envisaged that a thinner second layer may be employed provided that it adequately fulfils desired requirements and provides a non-adhesive face of the shoe stiffener. It is also envisaged that thicknesses of the order of 0.05-0.1 mm or greater for the second layer may be employed.

The first layer may be manufactured in a range of gauges, dependent on the properties desired in the shoe stiffener. We prefer to use a material having a gauge of 0.2-0.75 mm, more preferably 0.3-0.4 mm.

It may be desired to provide an adhesive layer on the first layer providing the main body of the shoe stiffener so that the adhesive does not have to be coated thereon at a later stage before the toe puff and shoe upper are inserted into the toe puff fusion press. Therefore a shoe stiffener according to the invention may further comprise a co-extruded layer of adhesive composition. Alternatively the adhesive may be applied as a separate layer by a roller coating or slot coating process. We prefer to use an ethylene/vinyl acetate based hot melt adhesive, however any suitable hot melt adhesive may be employed. The hot melt adhesive composition is primarily intended to be applied to the ionomeric material for the bonding of the toe puff to the upper, however, it is also envisaged that it may be desirable to provide an adhesive layer on the other side of the co-extruded layers where for example, it is desired to affix the nylon to a lining material.

It may be desired to employ the usual additives known in the art, for example filler material, in a shoe stiffener according to the invention.

The invention provides in another of its aspects a shoe stiffener material comprising co-extruded layers of plastics film, a first, thicker, one of the layers comprising an ionomeric material and a second of the layers comprising a plastics material which does not adhere to a fusion press under the conditions normally encountered therein during bonding of a shoe stiffener to a shoe upper, wherein the thickness of the shoe stiffener material is in the range 0.2-0.8 mm.

The above discussion has been made primarily with reference to toe puffs, however a shoe stiffener according to the invention, of suitable properties may be employed as a counter.

There now follows a detailed description to be read with reference to the accompanying drawing of an illustrative shoe stiffener and the manufacture thereof. The shoe stiffener has been selected for description to illustrate the invention by way of example.

BRIEF DESCRIPTION OF THE DRAWINGS

In the drawings:
The figure 1 is a view of an extrusion apparatus suitable for use in providing a shoe stiffener according to the invention.

THE PREFERRED EMBODIMENT OF THE INVENTION

The illustrative shoe stiffener comprises two co-extruded layers of plastics film, a first, thicker of the layers comprising Surlyn (RTM) 8920 available from Dupont and the second, thinner, of the layers comprising Nylon 6 B40F available from Bayer.

Surlyn (RTM) granules are fed into a barrel 12 of a 32 mm main extruder 10 having a length: diameter ratio of 25:1. The barrel 12 is provided with four heating zones 14, 16, 18, 20 heated to temperatures of 250° C., 250° C., 225° C. and 215° C. respectively. Nylon 6 B40F granules are fed into a barrel 22 of a 20 mm secondary extruder 24 having a length: diameter ratio of 20:1 and provided with three heating zones 26, 28 and 30 heated to the temperatures of 250° C., 250° C. and 210° C. respectively. Melted material from the extruders 10, 24 feeds into a combining adaptor 32. The molten Surlyn (RTM) and nylon 6 are brought together in the combining adaptor 32 and are then co-extruded as a co-extrusion material 33 comprising layers of Surlyn (RTM) 34 and nylon 6 36 through a 450 mm extrusion die 38. The extrusion die 38 is set to the required thickness of the co-extruded layers. The ratio of the different layer thicknesses can be controlled by varying the outputs from the two extruders 10, 24. Preferably the bsolute thickness of the nylon 6 should remain constant and the thickness of the Surlyn (RTM) be varied. Coloring is added to the nylon 6. The co-extrusion material 33 passes between cooling rollers 40 at a temperature of 40° C. and set at a distance apart slightly less than the gauge of the co-extrusion material. The material is then reeled onto storage rolls (not shown.)

Table 1 indicates the properties of the shoe stiffener material.

TABLE 1

| | |
|---|---|
| Total weight of shoe stiffener material | 520 g/m² |
| Total weight of nylon 6 | 10 g/m² |
| Total gauge of shoe stiffener material | 0.6 mm |
| Dead load collapse test | 3 lbs |
| Dome height retention | 89% |
| Flex | 16,800 cycles |

A suitable ethylene-vinyl acetate based hot melt adhesive is applied to the Surlyn (RTM) face of the co-extrusion material by roller coating.

Shaped shoe stiffeners, viz. toe puffs, are cut from the co-extrusion material and are skived on the nylon side of the co-extruded layers. The toe puffs are placed on a toe end portion of a shoe upper with the adhesive against the upper and pressed in a toe-puff fusion press to activate the adhesive and bond the toe puff to the upper; the platen of the press which contacts the nylon layer 36 is heated to a temperature of about 180° C.

There is little or no tendency for the toe puff to adhere to the platen of the press but toe puffs are found to adhere firmly to the upper. The toe puff can readily be activated for lasting and the toe end of the shoe is found to satisfactorily retain its shape during wear.

I claim:

1. In a method of making shoes wherein a shoe stiffener material is bonded to a shoe upper by a hot melt adhesive by positioning said shoe stiffener material and said shoe upper with said hot melt adhesive therebetween is a fusion press having two platens, one of which is heated to a temperature of approximately 180°–200° C., and pressing said platens together wherein the adhesive is heated and bonds the stiffener material to the shoe upper, the improvement which comprises:

employing, as said shoe stiffener, a material comprising co-extruded non-fabric layers of plastic film, a first of the non-fabric layers comprising an ionomeric material and providing a main body of the stiffener, and a second of the non-fabric layers comprising a plastic material which does not adhere to said fusion press under the conditions normally encountered therein during bonding of a shoe stiffener to a shoe upper.

2. The method according to claim 1 wherein the second of the layers has a softening point of at least 180° C.

3. The method according to claim 1 wherein said material comprises co-extruded layers, a first of the non-fabric layers comprising an ionomeric material and a second of the non-fabric layers comprising a thermoplastic material having a softening point of at least 180° C.

4. The method according to claim 1 wherein the second of the layers comprises nylon 6.

5. The method according to claim 1 wherein said material further comprises a co-extruded layer of adhesive composition on the first of the layers.

6. The method according to claim 1 wherein an adhesive layer is coated on at least the first of the co-extruded layers.

7. The method according to claim 1 wherein the thickness of the first layer is in the range of 0.2–0.75 mm and the thickness of the second layer is in the range 0.02–0.03 mm.

8. The method according to claim 1 wherein the second of the layers comprises polymethylpentene, polyester or polycarbonate.

9. In a method of making shoes wherein a shoe stiffener material is bonded to a shoe upper by a hot melt adhesive by positioning said shoe stiffener material and said shoe upper with said hot melt adhesive therebetween in a fusion press having two platens, one of which is heated to a temperature of approximately 180°–200° C., and pressing said platens together wherein the adhesive is heated and bonds the stiffener material to the shoe upper, the improvement which comprises:

employing, as said shoe stiffener, a material comprising co-extruded non-fabric layers of plastic film, a first of the non-fabric layers comprising an ionomeric material and providing a main body of the stiffener material and a second of the non-fabric layers comprising a plastic material which does not adhere to said fusion press under the conditions normally encountered therein during the bonding of a shoe stiffener to a shoe upper, wherein the thickness of the shoe stiffener material is in the range 0.2–0.8 mm.

10. The method according to claim 9 wherein the second of the layers comprises nylon 6.

* * * * *